(12) United States Patent
Carlsson et al.

(10) Patent No.: US 8,425,670 B2
(45) Date of Patent: Apr. 23, 2013

(54) PLANT FOR SEPARATING OIL FROM A GAS MIXTURE, AND A METHOD FOR SEPARATING OIL FROM A GAS MIXTURE

(75) Inventors: Claes-Göran Carlsson, Tullinge (SE); Göran Ström, Rönninge (SE)

(73) Assignee: Alfa Laval Corporate AB, Lund (SE)

( * ) Notice: Subject to any disclaimer, the term of this patent is extended or adjusted under 35 U.S.C. 154(b) by 0 days.

(21) Appl. No.: 13/147,404

(22) PCT Filed: Jan. 26, 2010

(86) PCT No.: PCT/SE2010/050067
§ 371 (c)(1),
(2), (4) Date: Oct. 13, 2011

(87) PCT Pub. No.: WO2010/090578
PCT Pub. Date: Aug. 12, 2010

(65) Prior Publication Data
US 2012/0031270 A1 Feb. 9, 2012

(30) Foreign Application Priority Data
Feb. 5, 2009 (SE) ...................... 0900139

(51) Int. Cl.
*B01D 45/12* (2006.01)
(52) U.S. Cl.
USPC ............... 95/270; 95/8; 95/12; 95/19; 95/20; 55/400; 55/403; 55/404; 55/405; 55/406; 55/409; 55/467; 96/397
(58) Field of Classification Search ............... 55/400, 55/403–406, 409, 467; 95/270, 8, 12, 19–20; 96/397
See application file for complete search history.

(56) References Cited

U.S. PATENT DOCUMENTS

| | | | |
|---|---|---|---|
| 2,873,814 A | 2/1959 | Maher | |
| 2,941,619 A | 6/1960 | Sochor | |
| 4,613,349 A | 9/1986 | Drapp et al. | |
| 4,687,585 A | 8/1987 | Ramshaw | |
| 5,755,096 A | 5/1998 | Holleyman | |
| 5,762,149 A | 6/1998 | Donovan et al. | |

FOREIGN PATENT DOCUMENTS

| | | |
|---|---|---|
| EP | 0082630 | 6/1983 |
| EP | 0711903 | 5/1996 |
| FR | 2476505 | 8/1981 |
| SE | 525432 | 2/2005 |
| SU | 1820841 A3 | 6/1993 |
| WO | WO90/06472 | 6/1990 |
| WO | WO2008/111909 | 9/2008 |

OTHER PUBLICATIONS

Decision to Grant for corresponding Russian Application No. 2011136632/05, dated Oct. 31, 2013.

*Primary Examiner* — Jason M Greene
*Assistant Examiner* — Dung H Bui
(74) *Attorney, Agent, or Firm* — Michaud-Kinney Group LLP

(57) ABSTRACT

The invention refers to a plant and a method for separating oil in form of particles and/or mist from a fossil gas mixture for obtaining a separated gas. The plant comprises a centrifugal separator with a stationary casing defining a separation space. The casing permits a pressure of at least 10 bars in the separation space. The centrifugal separator comprises an inlet for the gas mixture, a gas outlet for the separated gas and an oil outlet for discharging separated oil. A separating member for separating the gas mixture comprises a plurality of separating discs and is provided in the separation space. A drive motor is connected to the separating member via a spindle and rotate the separating member about an axis (x) of rotation.

14 Claims, 4 Drawing Sheets

PLANT FOR SEPARATING OIL FROM A GAS MIXTURE, AND A METHOD FOR SEPARATING OIL FROM A GAS MIXTURE

FIELD OF THE INVENTION

The present invention refers to cleaning of natural gas, and especially separating oil from natural gas. Furthermore, the invention refers to separating oil in the form of particles, preferably liquid particles, and/or mist from a fossil gas mixture by means of a centrifugal separator comprising a stationary casing defining a separation space permitting a gas flow therethrough. The invention also refers to a method for separating oil in the form of particles and/or mist gas from a fossil gas mixture.

BACKGROUND OF THE INVENTION

When producing natural gas for delivery via for instance a gas conduit, the natural gas is received from the source at a very high pressure. The natural gas comprises larger or smaller amounts of undesired substances, such as oil, water, heavier hydrocarbons etc., in the form of liquid particles. Before delivery of the natural gas, for instance via a pipe line, the gas has to be treated and undesired substances, such as oil, be removed. Thereafter, the pressure has to be reduced to a manageable level. Today separating members in the form of so-called scrubbers for separating oil from the natural gas are used. The expression fossil gas mixture can in the present application refer to natural gas. The expression may also refer to the gas or gas mixture which is obtained during production of oil from natural oil sources. Such a gas or gas mixture may contain large amounts of liquid particles.

WO 2008/111909 discloses a particle separator for separating particles from a gas mixture. The separator comprises a stationary casing, defining a separation space permitting a gas flow therethrough, and an inlet for the gas mixture through the casing into the separation space. A rotation member is provided in the separation space downstream the inlet with respect to the gas flow and arranged to cause the gas mixture to rotate. A separating member for separating the gas mixture comprises a spindle with a plurality of separating discs and is provided in the separation space downstream the rotation member with respect to the gas flow. A drive motor is connected to the spindle and arranged, during the separation, to rotate the separating member via the spindle in a direction of rotation about an axis of rotation at a number of revolutions lying within a range of revolutions. The separating member is configured to separate particles from the gas mixture by means of centrifugal forces. Furthermore, a gas outlet is provided downstream the separating member with respect to the gas flow for discharge of the separated gas. An oil outlet for discharge of oil extends through the casing. The separator disclosed is not suitable for treating a fossil gas mixture, and especially not for separating oil from the fossil gas mixture.

U.S. Pat. No. 4,687,585 discloses a plant and a method for separating at least one component from a fossil fluid, such as crude oil or natural gas, during utilization of a device comprising a centrifuge rotor. The centrifuge rotor in the known device comprises a central hollow inlet chamber and a number of conical separating discs. The fossil fluid is conveyed centrally into the central chamber and then flows radially outwardly in the interspaces between the separating discs.

U.S. Pat. No. 5,755,096 discloses a dynamic filter arranged to be connected to a natural gas source. The dynamic filter comprises a stationary casing with a rotating separating rotor comprising separating discs extending mainly axially. The separating member seems to driven by means of the flow of natural gas.

FR-A-2 476 505 discloses a cyclone for separating particles from a gas. The cyclone comprises a rotor member, which comprises a number of discs and which is provided in the cyclone immediately inside the outlet of the cyclone for cleaned gas.

SE-525 432 discloses a centrifugal separator for cleaning of pressurised air from a compressor and to a brake system of a motor vehicle. The centrifugal separator is arranged to remove impurities from the compressor.

SUMMARY OF THE INVENTION

One object of the present invention is to provide an efficient separation of oil from a fossil gas mixture, such as for instance natural gas. Furthermore, it is aimed at an efficient separation immediately or substantially immediately after the fossil gas mixture has been extracted from the source, i.e. an efficient separation under a high pressure.

Since the stationary casing is configured in such a way that it permits a pressure of at least 10 bars, or preferably at least 20 bars, in the separation space during the separation, the centrifugal separator can be used for an efficient separation of oil from a fossil gas mixture, or natural gas, just after the extraction of the gas mixture. The centrifugal separator enables separation directly after the gas mixture has been extracted or after one or a small number of preceding treatment stages, for instance a preceding separation of oil in a scrubber.

According to one aspect of present the invention, the plant is configured for counter flow separation, which means that the rotating gas mixture is guided into the separating member radially from outside the periphery of the separating member and into the gaps present between the separating discs towards the centre and the central outlet chamber. The oil and possible other substances which are present in the gas mixture will get attached to the separating discs and be conveyed outwardly and thrown towards the inner wall of the stationary casing at the same time as the cleaned gas is conveyed inwardly into the central outlet chamber and from there out through the outlet.

According to an embodiment of the invention, the gas outlet comprises a gas outlet pipe which is arranged to permit connection to the gas conduit for receiving the separated gas from the centrifugal separator, wherein this connection is configured to resist said pressure. The pressure in the gas conduit and in the separation space is the same, and the stationary casing shall thus have the same pressure strength as the gas conduit transporting the gas. Furthermore, also the inlet may comprise an inlet pipe which is arranged to permit connection to the gas conduit for supply of the gas mixture to the centrifugal separator, wherein this connection also is configured to resist said pressure.

According to an embodiment of the invention, the centrifugal separator comprises a rotation member, which is provided in the separation space downstream the inlet and upstream the separating member with respect to the gas flow and arranged to cause the gas mixture to rotate. Thanks to such a rotation member, the incoming gas mixture obtains an initial rotary motion which contributes to a certain separation of oil and possibly other liquid or particulate substances from the gas. Consequently, a higher cleaning degree is achieved in the separating member. The kinetic energy of the incoming gas mixture may in this manner also contribute to a lower energy consumption for the driving of the separating member.

Advantageously, the rotation member has a tangential opening configured to guide the gas mixture in a tangential direction from the inlet into the separation space so that the gas mixture is caused to rotate. By means of such a rotation, at least a part of the oil will be separated from the gas mixture and by the centrifugal force moved outwardly towards an inner wall of the separation space. The rotation member may also, as a supplement or alternative, comprise a turbine wheel which is provided on the spindle. Such a turbine wheel will in a similar way as the cyclone-like design cause the gas mixture to rotate and provide an initial separation of oil from the gas mixture. Advantageously, the drive motor may be provided to drive the separating member during the separation in cooperation with the turbine wheel. The turbine wheel will due to the flow velocity of the gas mixture be caused to rotate by the flowing gas mixture. This rotation can be used for the driving of the separating member.

According to an embodiment of the invention, the range of revolutions is 1000 to 3000 revolutions/minute. The separating member thus rotates at a relatively low rotary velocity.

According to an embodiment of the invention, the drive motor comprises a hydraulic motor. It is to be noted that also other kinds of motors may be used, for instance an electric motor or a pneumatic motor. It is also possible to drive the separating member and the spindle by means of a turbine.

According to an embodiment of the invention, the drive motor is provided inside the stationary casing. In such a way, the spindle is completely enclosed in the stationary casing. Thus there is no need for any passage of moving parts through the stationary casing. This is advantageous due to the high pressure prevailing in the separation space and being substantially higher than the surrounding pressure.

According to an embodiment of the invention, the centrifugal separator is configured to be provided in such a way that the axis of rotation extends substantially vertically.

According to an embodiment of the invention, the centrifugal separator is configured to be provided in such a way that the axis of rotation extends substantially horizontally.

According to an embodiment of the invention, the plant comprises a separating device provided on the gas conduit upstream the centrifugal separator. The separating device may comprise a scrubber.

The object is also achieved by the initially defined method defined in claim 14.

BRIEF DESCRIPTION OF THE DRAWINGS

The present invention is now to be explained more closely through a description of various embodiments and with reference to the drawings attached hereto.

DETAILED DESCRIPTION OF VARIOUS EMBODIMENTS

Figure 1:
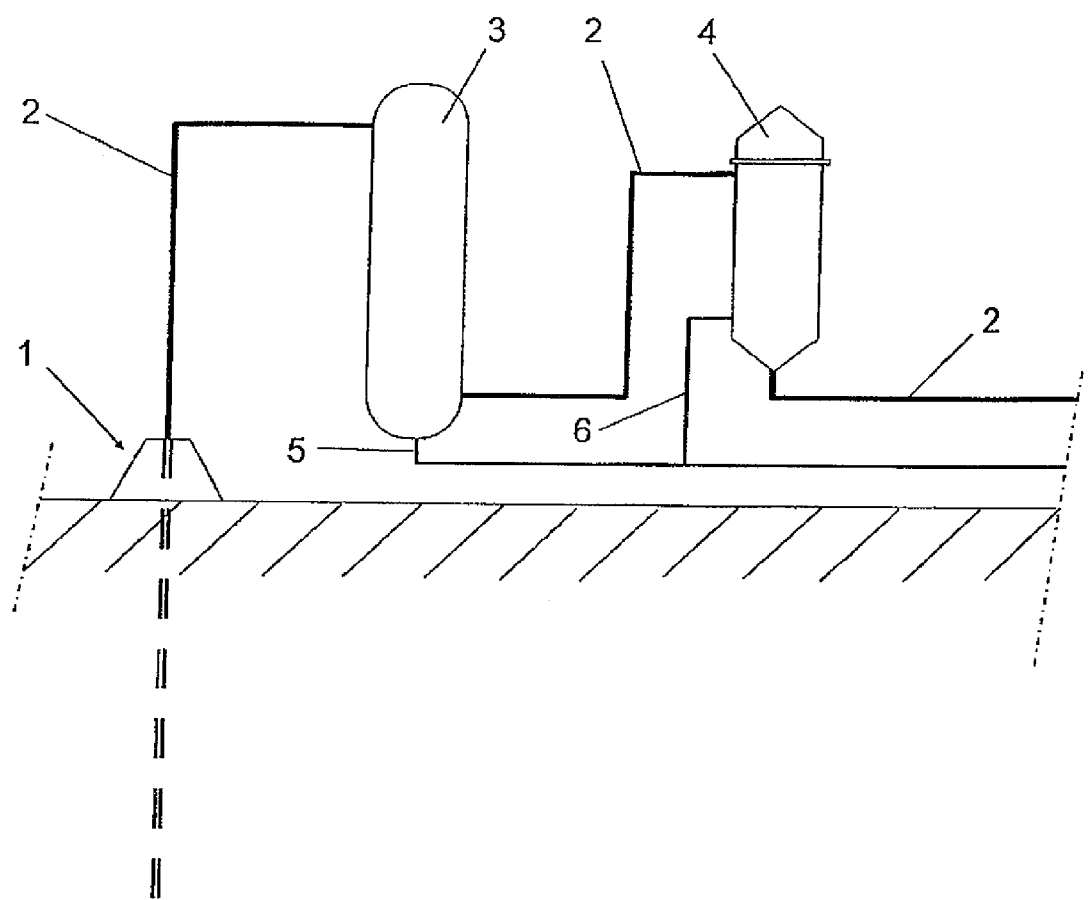
FIG. 1 discloses a schematic view of a plant for extraction of a fossil gas mixture.

FIG. 1 discloses schematically a plant for extraction of a fossil gas mixture, and especially extraction of natural gas. From a natural gas source 1, the fossil gas mixture is conveyed in a gas conduit 2 to a first separating device 3. The separating device 3 is in the plant configured to provide a first separation, or pre-separation, of oil and other substances, preferably in liquid form from the fossil gas mixture.

The first separating device 3 may comprise one, or possibly several, scrubbers of a kind known per se.

The fossil gas mixture, which arrives from the source 1 has a high pressure in the order of 10-70 bars. The fossil gas mixture, which is initially cleaned in the first separating device 3, is then conveyed, still at the high pressure, through a gas conduit 2 to a further separating device in the form of a centrifugal separator 4. The centrifugal separator 4 is configured for further cleaning of the fossil gas mixture and separation of oil, and possibly other liquid and/or particulate substances, from the gas mixture.

The cleaned gas, which is discharged from the centrifugal separator 4 is conveyed further in the gas conduit 2 for distribution or for further possible treatment. The separated product from the separating device 3 is conveyed via a discharged conduit 5 to a suitable collection. The separated product, mainly oil, is conveyed from the centrifugal separator via a discharge conduit 6 to suitable collection.

It is to be noted that the plant disclosed in FIG. 1 may comprise many further components, for instance compressors and devices for regulating the pressure of the gas mixture. The plant and the centrifugal separator 4 are described for production of a separated or clean gas from a fossil gas mixture, such as natural gas.

The plant and the centrifugal separator 4 may also be used for production of a separated or clean gas from crude oil, wherein fossil gas mixture to be cleaned is obtained through pressure relief.

Figure 2:
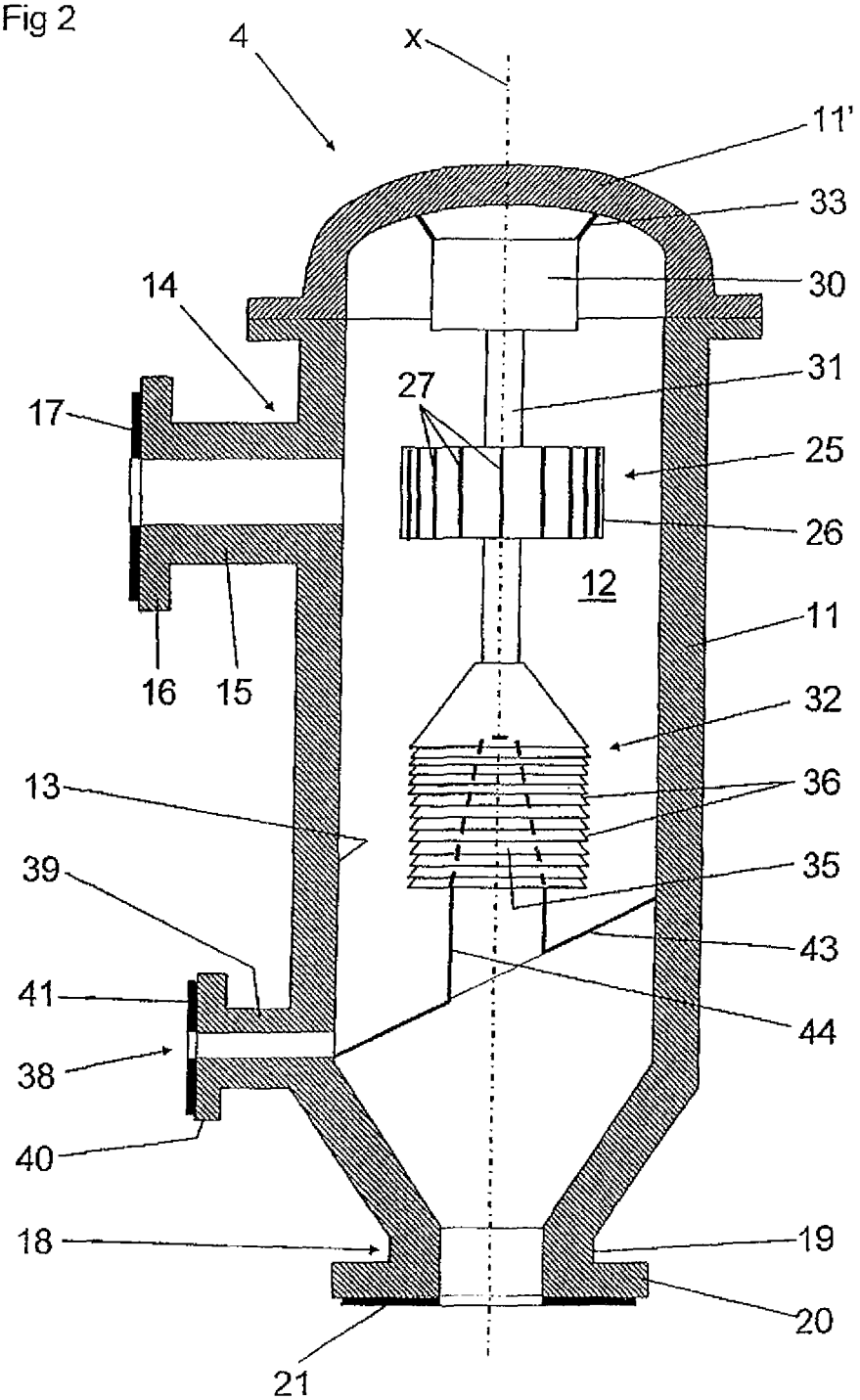
FIG. 2 discloses a sectional view through a centrifugal separator of the plant according to a first embodiment of the invention.
Figure 3:
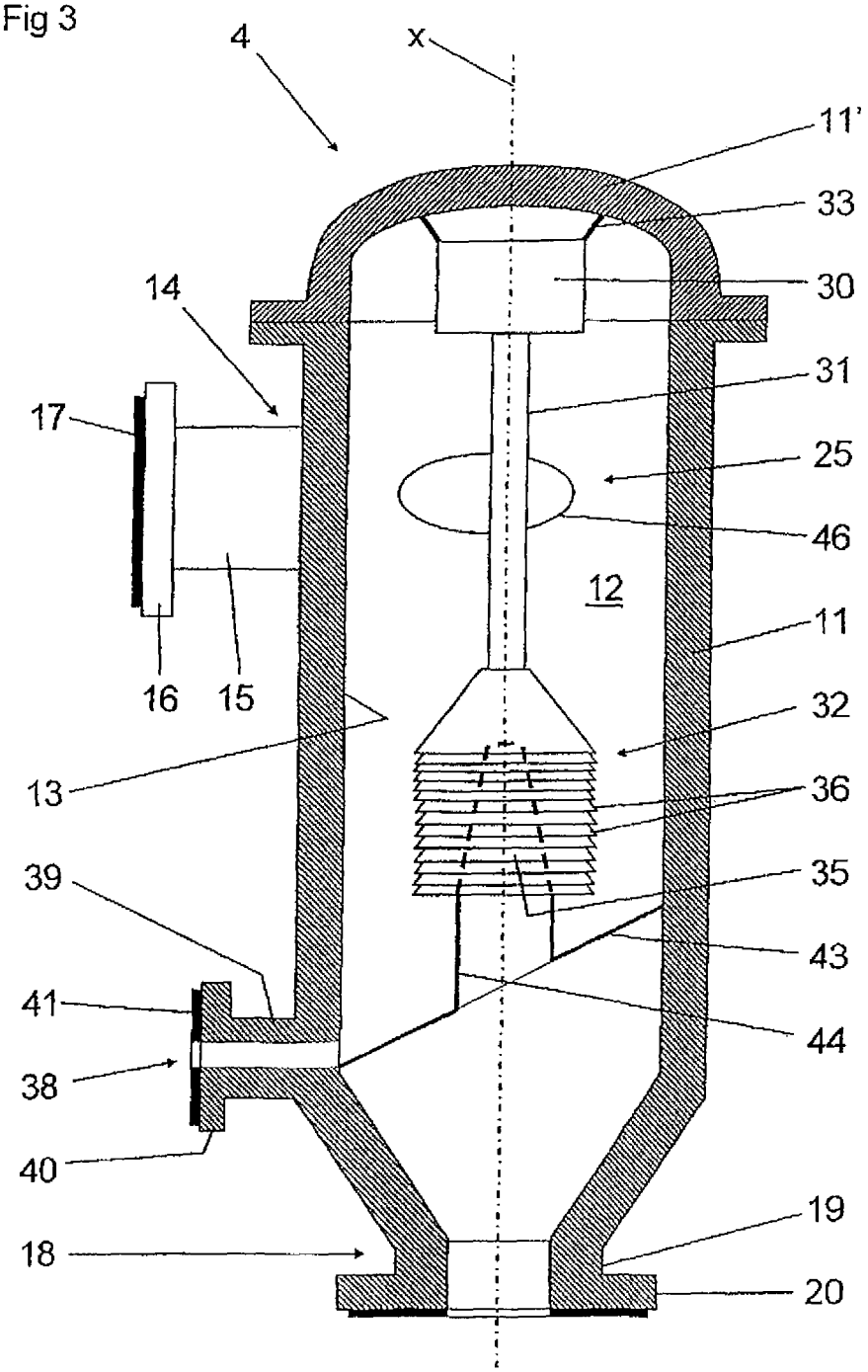
FIG. 3 discloses a sectional view through a centrifugal separator of the plant according to a second embodiment of the invention.
Figure 4:
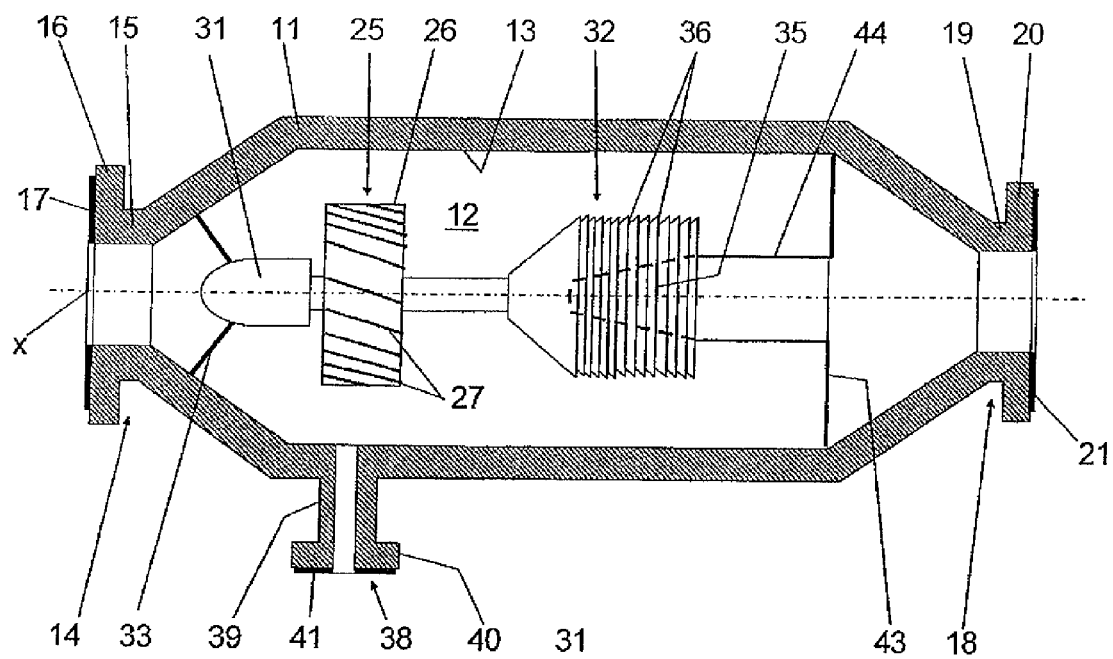
FIG. 4 discloses a sectional view through a centrifugal separator of the plant according to a third embodiment of the invention.

Various embodiments of the centrifugal 4 is now to described more closely with reference to FIGS. 2 to 4. It is to be noted that the same reference signs are used for designating components with the same or similar function.

FIG. 2 discloses a centrifugal separator 4, which is especially configured for separation of a gas from a fossil gas mixture containing the gas and oil in the form of particles and/or mist, and possible other liquid or particulate substances. The centrifugal separator 4 comprises a stationary casing 11 defining a separation space 12 through which the gas mixture may flow. The stationary casing 11 has an inner wall 13 which faces the separation space 12.

The stationary casing 11 has a cylindrical or substantially cylindrical shape, and especially a circular cylindrical or substantially cylindrical shape.

The centrifugal separator 4 comprises an inlet 14 for the gas mixture. The inlet 14 extends through the casing 11 and thus permits the feeding of the gas mixture into the separation space 12. The inlet 14 comprises an inlet pipe 15 which is arranged to permit connection to the gas conduit 2, compare FIG. 1. The inlet pipe 15 comprises a flange 16 which is arranged to be connected to a corresponding flange of the gas conduit 2. Between the flange 16 of the inlet pipe 15 and the corresponding flange of the gas conduit 2 a gasket 17 may be provided. The centrifugal separator also comprises a gas outlet 18 for the separated gas. The gas outlet 18 extends through the casing 11 and comprises a gas outlet pipe 19 arranged to permit connection to the gas conduit 2, compare FIG. 1. The gas conduit 19 also comprises a flange 20 which is configured to be connected to a corresponding flange of the gas conduit 2. Between the flange 20 of the outlet pipe 19 and the flange of the gas conduit 2 a gasket 21 may be provided.

The centrifugal separator 4 also comprises a rotation member 25 provided in the separation space 12 downstream, or immediately downstream, the inlet 14 with respect to the gas flowing through the centrifugal separator. The rotation member 25 is arranged to cause the incoming gas mixture to rotate. The gas mixture thus obtains a rotary movement so that at least a part of the oil and/or the liquid present in the gas mixture will be thrown outwardly towards the inner wall 13 of the casing 11 due to the centrifugal force.

In the first embodiment, the rotation member 25 comprises a turbine wheel 26 with schematically indicated turbine blades 27.

The centrifugal separator 4 also comprises a drive motor 30, a spindle 31 connected to the drive rotor 30 and a separating member 32 connected to the spindle 31. The drive motor is attached to the casing 11 by means of attachment members 33. The drive motor 30 is arranged to rotate the spindle 31, and thus the separating member 32, in a direction r of rotation about an axis x of rotation at a number of revolutions which is lying within a range of revolutions. The range of revolutions is in the context relatively low and more precisely 1000 to 3000 revolutions per minute. In the first embodiment, the axis x of rotation extends vertically or substantially vertically.

The separating member 32 comprises a central outlet chamber 35 and a large number of separating discs 36 which are provided outside the central outlet chamber 35. The separating discs 36 are rotary symmetric with respect to the axis x of rotation. The separating discs 36 may have a tapering shape. In the embodiments disclosed the separating discs 36 taper in a direction towards the inlet 14. Especially, the separating discs 36 may have a conical shape. However, it is to be noted that the shape can deviate somewhat from a purely conical shape, i.e. the separating discs 36 may have a somewhat curved generatrice. Each separating disc 36 may advantageously comprise a number of distance members (not disclosed) which contribute to reduce the pressure drop and/or to improve the separation. The distance members also define the size of the gap formed between adjacent separating discs 36 of the separating member 32. The distance members may be spot-shaped or elongated with a straight or curved extension.

Consequently, the separating member 32 is configured to separate oil and possibly other liquid and particulate substances from the fossil gas mixture. The centrifugal separator 4 is configured for counter flow separation, i.e. the separated oil and the possible other substances are conveyed out from the separating member 32 against the flow of the gas mixture, which is rotating and conveyed into the separating member 32. The gas mixture which is present in the separation space 12 thus rotates. The rotating gas mixture is conveyed into the separating member 32 radially from outside, i.e. from a radially outer position outside the periphery of the separating member 32 into the gaps between the separating discs 36. The gas mixture is then conveyed into the gaps towards the centre of the central outlet chamber 35. Thanks to the rotation of the separating member 32, oil and possible other remaining particles will get attached to the separating discs 36, conveyed outwardly towards the periphery of the separating member 32, and by means of the centrifugal force be thrown radially outwardly towards the inner wall 13 of the casing 11. The oil and possible other liquid can then flow along the inner wall 13 downwardly towards an oil outlet 38 configured for discharge of oil and possible other liquid substances from the separation space 12 to the conduit 6, compare FIG. 1. The oil outlet 38 comprises an outlet pipe 39 with a flange 40 for connection to a corresponding flange of the conduit 6. A gasket 41 may be provided between the flange 41 and the corresponding flange of the conduit 6 for sealing of the connection.

As mentioned above, the fossil gas mixture has a high pressure. The centrifugal separator 4 is configured to provide the separation at this high pressure which is at least 10 bars. The stationary casing 11 is thus configured to permit the pressure of at least 10 bars, preferably at least 15, 20, 30, 40, 50, 60, 70 or more bars. The inlet 14, the gas outlet 18 and the oil outlet 38 are also configured in such a way that they resist the above mentioned high pressure and enable connection to the gas conduit 2 and the conduit 6, which also resist this pressure.

The turbine wheel 26 is provided on the spindle 31. The turbine wheel 26 may be rotating in relation to the spindle 31, wherein the flow of the incoming gas mixture will provide the rotation of the turbine wheel 26. The turbine wheel 26 may also be fixedly connected to the spindle 31. In this case, the incoming flow of the gas mixture will contribute to the driving of the turbine wheel 6 and also to the separating member 32 via the spindle 31. If the gas flow is powerful, the drive motor 30 may be of minor importance and merely function as an auxiliary motor, control motor or the like. If gas flow is weak, the drive motor 30 may form the main driving of the separating member 32 and possible also of the turbine wheel 26.

The spindle 31 is journalled in the drive motor 30 by means of a non-disclosed bearing. The spindle 31 may also be journalled in the lower end via a non-disclosed bearing which is connected to the stationary casing 11. As can be seen in FIG. 2, the centrifugal separator 4 also comprises a sheet 43 extending obliquely downwardly to the outlet 38. This sheet 43 comprises a pipe 44 which is concentric to the axis x of rotation and which extends into or to the separating member 32. The pipe 44 may carry said lower bearing. The central outlet chamber 35 thus has an opening into the pipe 44, i.e. the cleaned gas conduit is conveyed from the central outlet chamber 35 into the pipe 44.

From the pipe 44, the cleaned gas mixture is conveyed to a space downstream the sheet 43 and to the gas outlet 18.

In order to prevent non-cleaned gas or oil from penetrating into the central outlet chamber 35 and/or the pipe 44, a sealing (not disclosed) is preferably provided between the pipe 44 and the separating member 32. This sealing may comprise or consist of any suitable form of centrifugal sealing, a mechanical sealing or a gap sealing.

The drive motor 30 is in the embodiments disclosed provided inside the stationary casing 11. In such a way, no moving part extending through the casing 11 is needed. However, it is to be noted that it is also possible, within the scope of the invention, to provide the drive motor 30 outside the casing 11. In the embodiment disclosed, the drive motor 30 is fixedly connected to a cover 11' of the stationary casing 11 by means of the attachment members 33. During maintenance of the centrifugal separator 4, the cover 11' can easily be lifted, wherein the drive motor 30, the spindle 31, the turbine wheel 26 and the separating member 32 are lifted out of the separation space 12. The drive motor 30 may advantageously comprise a hydraulic motor. It is also possible to let the drive motor 30 comprise other kinds of motors, for instance an electric motor or a pneumatic motor.

FIG. 3 discloses a second embodiment of the centrifugal separator 4. The second embodiment differs from the first embodiment in that the rotation member 25 comprises a tangential opening 46 in the inner wall 13. The opening 46 is configured to guide the gas from the inlet 14 in a tangential direction into the separation space 12 so that the gas mixture is caused to rotate and obtains the above mentioned initial rotary movement contributing to a first separation of oil and other liquid or particulate substances from the gas. In such a way, the kinetic energy of the gas mixture is used for providing the separation, which also contributes to a reduced energy consumption for the driving of the separating member 32.

FIG. 4 discloses a third embodiment of the centrifugal separator 4. The third embodiment differs from the first embodiment in that the axis x of rotation extends horizontally, or substantially horizontally, but not vertically.

In the third embodiment, both the inlet 14 and the gas outlet 18 extend axially and are aligned with each other. The rotation member 25 comprises a turbine wheel 26 which is also provided on the spindle 31 and which is arranged to give the axially flowing incoming gas mixture a radial movement component contributing to give the gas mixture an initial rotary movement. In such a way, the rotation member 25 in the third embodiment will also contribute to a certain separation of oil and possible other liquid or particulate substances. The turbine wheel 26 may also in this embodiment be rotating in relation to the spindle 31 or fixedly provided on the spindle 31. The sheet 43 extends in the third embodiment radially with regard to the axis x of rotation.

The invention is not limited to the embodiments disclosed but may be varied and modified within the scope of the following claims.

The centrifugal separator 4 has been described above for so-called counter flow separation, i.e. the gas mixture is conveyed radially or substantially radially inwardly through the separating member 32 whereas the separated oil is conveyed outwardly on the separating discs 35 of the separating member 32.

What is claimed is:

1. A plant for separating oil in the form of particles and/or mist from a fossil gas mixture for obtaining a separated gas, wherein the plant comprises a gas conduit and a centrifugal separator provided on the gas conduit, wherein the centrifugal separator comprises
    a stationary casing, which defines a separation space permitting a gas flow therethrough,
    an inlet for the gas mixture through the casing into the separation space,
    a separating member for separating the gas mixture, which comprises a plurality of separating discs and a central outlet chamber provided inside the separating discs and which is provided in the separation space,
    a drive motor, which via a spindle is connected to the separating member and arranged, during the separation, to rotate the separating member via the spindle in a direction (r) of rotation about an axis (x) of rotation at a number of revolutions which lies within a range of revolutions, wherein the separating member is configured to separate oil from the gas mixture by means of centrifugal forces,
    a gas outlet which with respect to the gas flow is provided downstream the separating member and is directly connected to the central outlet chamber for discharge of the separated gas,
    an oil outlet for discharge of oil, wherein the oil outlet extends through the casing, the stationary casing is configured in such a way that it permits a pressure of at least 10 bars in the separation space during the separation, and wherein
    the plant is configured for counter flow separation in such a way that the gas mixture is caused to rotate and guided into the separating member radially from outside and in towards the central outlet chamber.

2. A plant according to claim 1, wherein the gas outlet comprises a gas outlet pipe, which is arranged to permit connection to the gas conduit for receiving the separated gas from the centrifugal separator, and wherein this connection is configured to resist said pressure.

3. A plant according to claim 2, wherein the inlet comprises an inlet pipe, which is arranged to permit connection to the gas conduit for supply of the gas mixture to the centrifugal separator, and wherein this connection is configured to resist said pressure.

4. A plant according to claim 1, wherein the centrifugal separator comprises a rotation member, which is provided in the separation space downstream of the inlet and upstream of the separating member with respect to the gas flow and arranged to cause the gas mixture to rotate.

5. A plant according to claim 4, wherein the rotation member comprises a tangential opening through the stationary casing and is configured to convey the gas mixture from the inlet in a tangential direction into the separation space so that the gas mixture is caused to rotate.

6. A plant according to claim 4, wherein the rotation member, comprises a turbine wheel provided on the spindle.

7. A plant according to claim 6, wherein during the separation the turbine wheel and the drive motor are configured to cooperate with one another to drive the separating member.

8. A plant according to claim 1, wherein the drive motor is configured to rotate the separating member in range of revolutions of about 1000 to about 3000 revolutions per minute.

9. A plant according to claim 1, wherein the drive motor comprises a hydraulic motor.

10. A plant according to claim 1, wherein the drive motor is provided inside the stationary casing.

11. A plant according to claim 1, wherein the centrifugal separator is configured to be provided in such a way that the axis (x) of rotation extends substantially vertically.

12. A plant according to claim 1, wherein the centrifugal separator is configured to be provided in such a way that the axis (x) of rotation extends substantially horizontally.

13. A plant according to claim 1, wherein the plant comprises a separation device which is provided on the gas conduit upstream of the centrifugal separator.

14. A method for separating oil in the form of at least one of particles and mist from a fossil gas mixture for obtaining a separated gas by means of a centrifugal separator comprising a stationary casing defining a separation space permitting a gas flow therethrough, wherein the method comprises:
    feeding the gas mixture into the separation space through an inlet, wherein a pressure of at least about 10 bars prevails in the separation space,
    causing the gas mixture to rotate and conveying the gas mixture radially from outside in through a separating member comprising a spindle with a plurality of separating discs and being provided in the separation space downstream the inlet with respect to the gas flow, to a central outlet chamber provided inside the separating discs, wherein oil is separated from the gas mixture by means of centrifugal forces in that the separating member is rotated in a direction (r) of rotation about an axis (x) of rotation at a number of revolutions lying within a range of revolutions,
    discharging the separated gas from the central outlet chamber through a gas outlet, which is directly connected to the central outlet chamber and which with respect to the gas flow is provided downstream the separating member, and
    discharging oil through an oil outlet extending through the casing.

* * * * *